Figure 5:
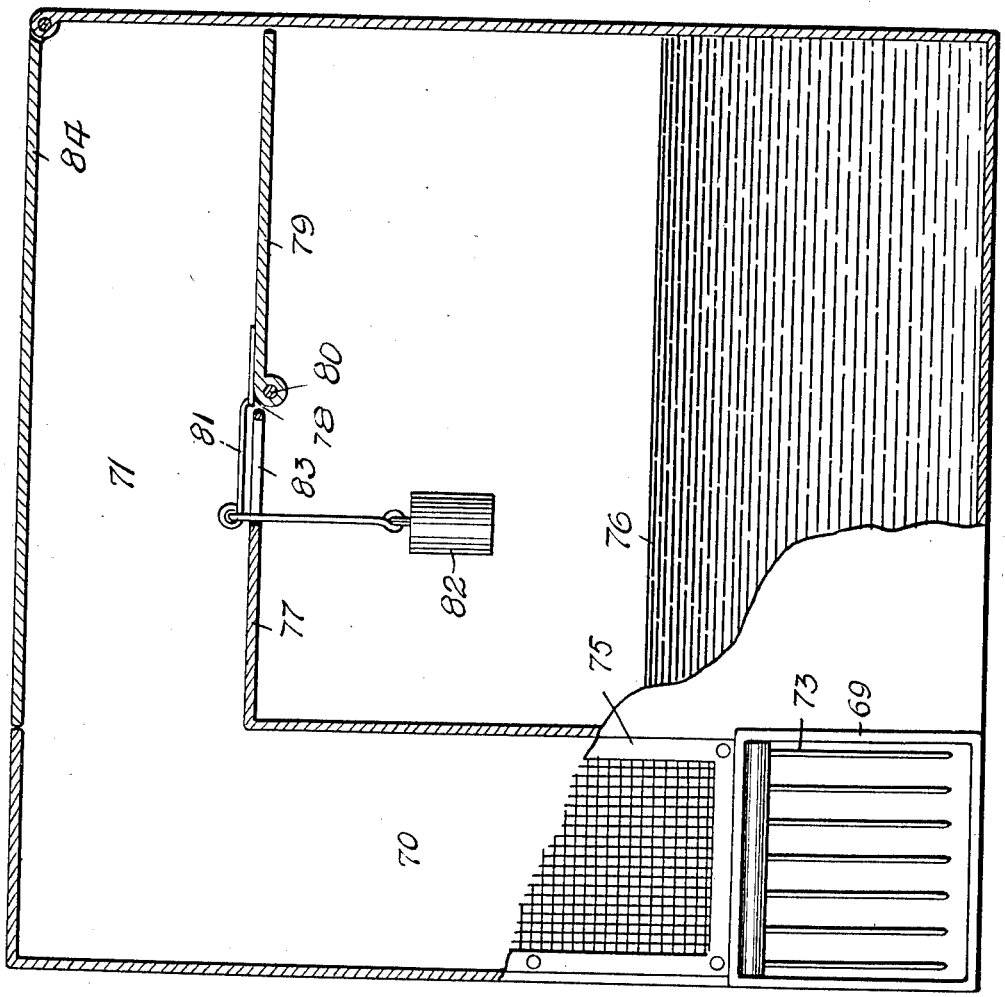

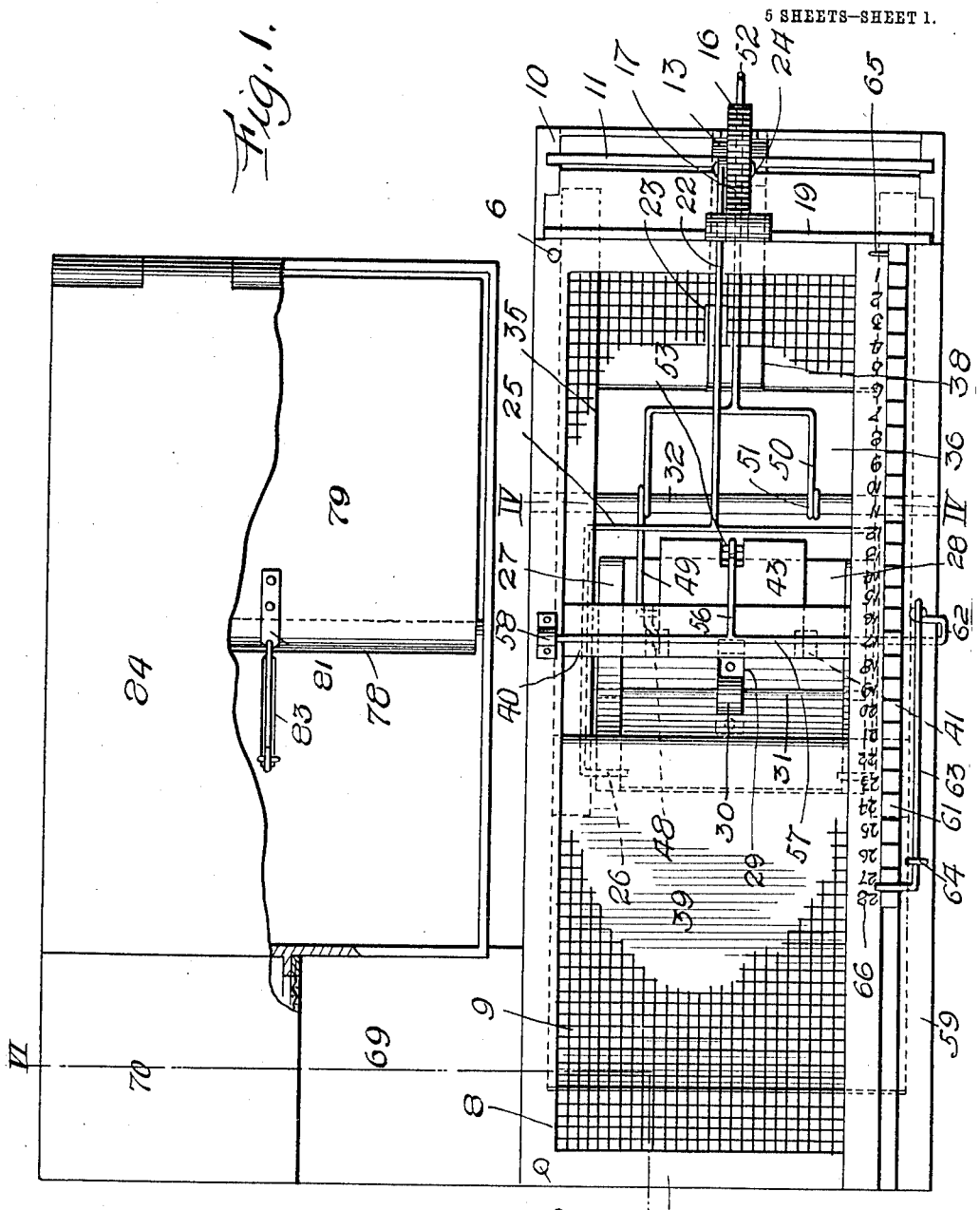

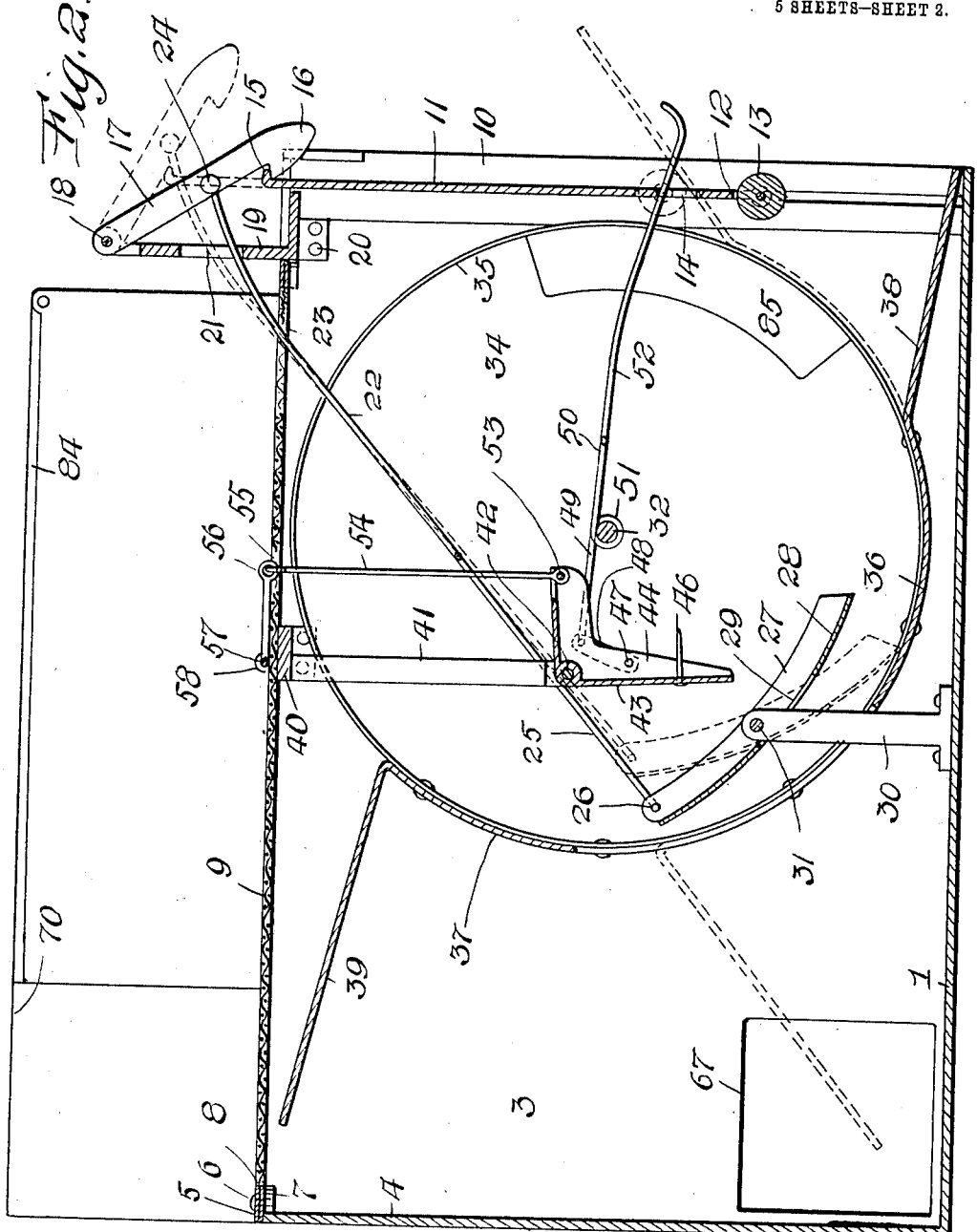

F. CSISZARIK.
RAT TRAP.
APPLICATION FILED JUNE 5, 1912.

1,066,888.

Patented July 8, 1913.
5 SHEETS—SHEET 3.

WITNESSES
Samuel Payne
J. P. Appleman

INVENTOR
F. Csiszarik
BY
ATTORNEYS

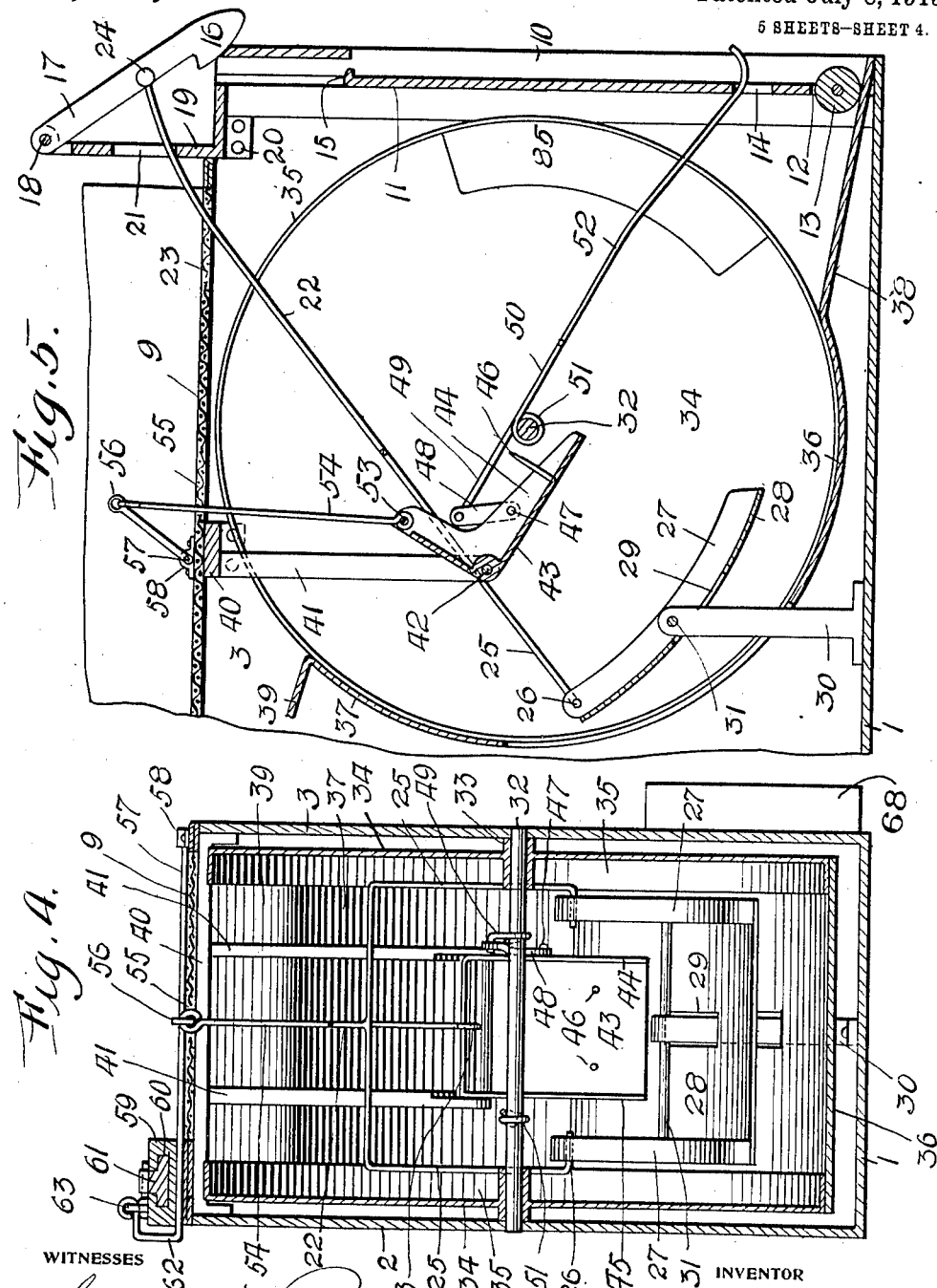

F. CSISZARIK.
RAT TRAP.
APPLICATION FILED JUNE 5, 1912.
1,066,888.
Patented July 8, 1913
5 SHEETS—SHEET 5.
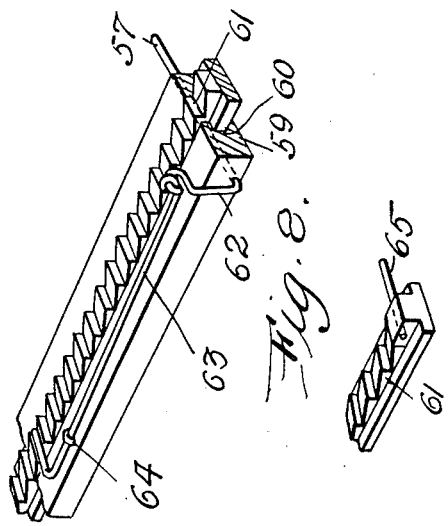
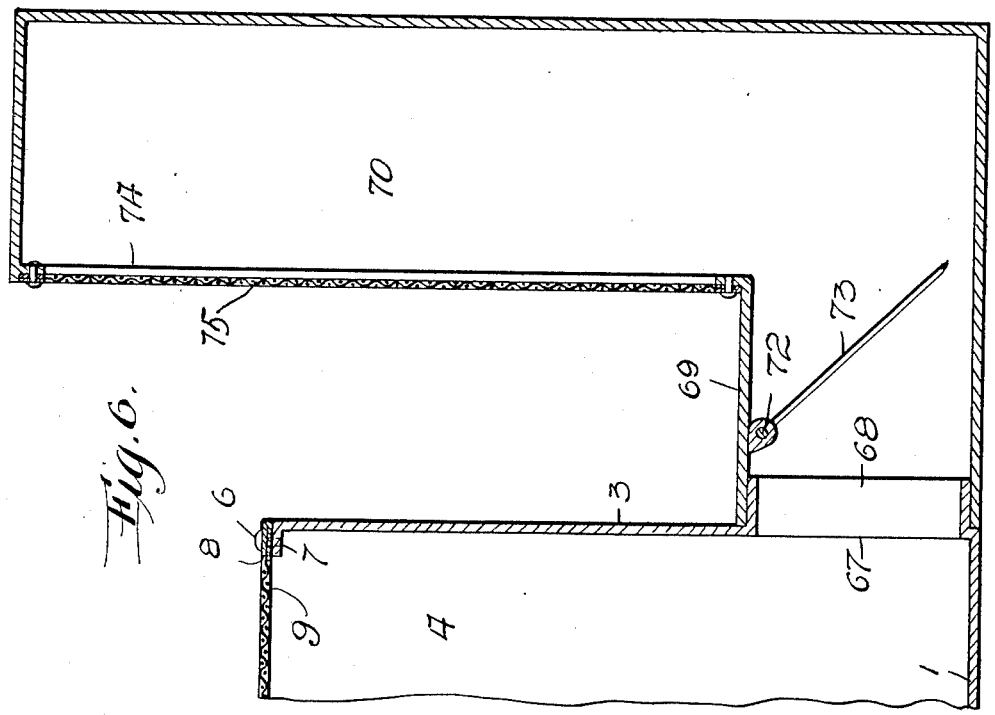
WITNESSES
Samuel Payne.
INVENTOR
F. Csiszarik
BY
ATTORNEYS

UNITED STATES PATENT OFFICE.

FILIP CSISZARIK, OF SPRINGDALE, PENNSYLVANIA.

RAT-TRAP.

1,066,888. Specification of Letters Patent. Patented July 8, 1913.

Application filed June 5, 1912. Serial No. 701,938.

*To all whom it may concern:*

Be it known that I, FILIP CSISZARIK, a subject of the King of Hungary, residing at Springdale, in the county of Allegheny and State of Pennsylvania, have invented certain new and useful Improvements in Rat-Traps, of which the following is a specification, reference being had therein to the accompanying drawing.

This invention relates to an animal trap, and more particularly to a trap especially designed for exterminating, by drowning, rats and other rodents.

The primary object of my invention is to provide a rat trap that can be advantageously used in large buildings and wharfs that are infested with rodents, the traps being designed whereby a rodent can be enticed into the same and prevented from escaping after once entering the trap.

Another object of this invention is to provide a trap embodying an oscillatory drum that is actuated by a rodent, whereby a trap-door will be automatically released to entrap the rodent, the drum also depositing the rodent at the entrance of another portion of the trap, wherein provision is made for drowning or exterminating the life of the rodent. The construction of the oscillatory drum is such that the trap is reset by the rodent entrapped therein and provision is made whereby the oscillatory drum will actuate a tabulating device that maintains a record of the number of rodents entrapped.

A further object of this invention is to provide an animal trap that is positive in its operation, not liable to injury by ordinary use, and highly efficient for entrapping and exterminating small animals.

With the above and other objects in view, the invention resides in a novel construction, combination and arrangement of parts to be hereinafter specifically described and then claimed.

Reference will now be had to the drawings, wherein like numerals denote corresponding parts throughout the several views, in which:—

Figure 1 is a plan of the trap, partly broken away and partly in section. Fig. 2 is a longitudinal sectional view of the trap, showing the same set for entrapping a rodent. Fig. 3 is a side elevation of the exterminating chamber or structure of the trap, partly broken away and partly in longitudinal section. Fig. 4 is a cross sectional view of the trap taken on the line IV—IV of Fig. 1. Fig. 5 is a longitudinal sectional view of a portion of the trap showing the same in a closed position. Fig. 6 is an enlarged cross sectional view of a portion of the trap taken on the line VI—VI in Fig. 1. Fig. 7 is a perspective view of a portion of the tabulating device, and Fig. 8 is a similar view of the same.

A trap in accordance with this invention comprises a rectangular box or casing having a bottom plate 1, side walls 2 and 3, a rear wall 4 and a top plate 5, which is riveted or otherwise secured, as at 6 to inwardly projecting lugs 7, carried by the upper edges of the walls 2, 3 and 4. The top plate 5 has a large rectangular opening 8 covered by a screen 9 of interwoven wire which admits light to the interior of the box or casing. The top plate 5 is of a less area than the bottom plate 1, said top plate terminating at a point removed or set back from the forward edges of the side walls 2 and 3. These side walls have the inner sides thereof provided with vertical guides 10 for a slide door 11. The lower edge of the slide door 11, intermediate the vertical edges thereof, is cut away, as at 12 to accommodate a revoluble anti-frictional roller 13, and said door, contiguous to the roller 13, has a slot 14. The upper edge of the door 11 has a central lug 15 and adapted to engage said lug is the hook shaped end 16 of an arm 17. The upper end of the arm is pivotally mounted by a pin 18 in the bifurcated upper end of an angle bracket 19 that is arranged transversely of the box or casing and has the ends thereof secured, as at 20 to the inner sides of the walls 2 and 3. The angle bracket 19 has a vertical slot 21 and this slot provides clearance for a rod 22 that extends through an opening 23 in the screen 9. The outer end of the rod 22 is pivotally connected, as at 24 to the arm 17. The inner end of the rod 22 has branches 25 pivotally connected, as at 26 to the side flanges 27 of a tiltable platform 28. The platform 28 has a central opening 29 to provide clearance for a post 30 mounted upon the bottom plate 1. The platform has the side flanges 27 thereof pivotally mounted upon a transverse rod 31, carried by the upper end of the post 30.

Arranged transversely of the box or casing is a shaft 32 and movably mounted upon said shaft, at the inner sides of the walls 2 and 3 are the hubs 33 of circular head 34, said head having inwardly projecting annular flanges 35 that are connected by transverse plates 36 and 37, said plates conforming in curvature to the peripheral flanges 35. The head 34 and the plates 36 and 37 constitute an oscillatory drum, the purpose of which will presently appear. The plates 36 and 37 are continuous, one or the other being provided with a slot for the passage of the post 30 and also to permit of the movement of the plates by the post 30. The plate 36 has a forwardly extending tongue 38 that extends under the slide door 11 and engages the anti-frictional roller 13, said tongue being employed for elevating or resetting the slide-door 11, as will hereinafter appear.

The upper edge of the transverse plate 17 has an extension 39 serving as a platform.

The upper inner edges of the side walls 2 and 3, intermediate the ends thereof, support a transverse bar 40 and this bar is provided with depending parallel hangers 41. Pivotally mounted between the lower ends of said hangers by a transverse pin 42 is a bait holder 43 in the form of an angle that has side flanges 44 and 45. The bait holder 43 is provided with a pin 46 upon which a suitable bait can be placed, said bait holder being located directly above the tiltable platform 28.

Connected to the side flange 44 by a pin 47 is a link 48 and pivotally connected to said link is one end 49 of a yoke 50. The yoke 50 has coiled portions 51 loosely mounted upon the shaft 32, and said yoke has a forward end thereof provided with a forwardly extending arm 52 that extends through the slot 14 of the slide door 11.

Pivotally connected to the upper end of the angle bait holder 43 by a pin 53 is a connecting rod 54 that extends upwardly through an opening 55 provided therefore in the screen 9. The upper end of the connecting rod 54 is loosely connected to a crank 56, carried by a rock shaft 57, journaled in a bearing 58 and a longitudinal guide 59, both of which are supported by the top plate 5. The guide 59 corresponds in length to the top plate 5 and said guide has a longitudinal inverted T shaped groove 60 to accommodate a rack 61 that is of a less length than said guide, said rack being inverted T shaped in cross section to slide in the groove 60. The end of the shaft 57 has a crank 62 and said crank is loosely connected to a pawl 63 loosely mounted in an eye or guide 64, carried by the guide 59. The end of the pawl 63 engages the rack 61 and when the shaft 57 is rocked, the pawl 63 intermittently moves the rack 61 relatively to the guide 59. The forward end of the rack 61 has an indicator or pointer 65 which indicates by graduations 66 upon the guide 59 the number of times the rack 61 has been intermittently moved. The rack 61 coöperates with the guide 59 in providing means for indicating the number of rats or animals entrapped in the box or casing. The side wall 3, at the rear end thereof, is provided with an opening 67 and the outer side of said wall has a rectangular collar 68 over which is fitted the end of a run-way 69 that is in communication with a vertical offset portion 70 of an exterminating structure or chamber 71. The runway 69 has the top thereof provided with a transverse pin 72 and extended from said pin are a plurality of bars 73 that swing to permit of a rat or other rodents passing into the offset portion 70 of the structure 71. The bars 73 serve as a guard to prevent a rat or other animal from escaping from the offset portion 70 after once having entered the same. The side of the offset portion 70 has a large rectangular opening 74 covered by a screen 75 preferably made of interwoven wire. This screen permits of a rat crawling to the top of the offset portion 70 of the structure 71. The structure 71 is adapted to contain water 76 or any suitable liquid, and adjacent to the top of said structure there is a horizontal platform 77. The platform 77 has an opening 78 at the forward end thereof and said opening is normally closed by a tiltable platform 79, similar to a trap door. The platform 79 is pivotally mounted upon a transverse rod 80, carried by the side walls of the structure and said platform is retained normally in a horizontal position by a rearwardly extending arm 81 from which there is suspended a weight 82. The platform 77 is slotted, as at 83 to provide clearance for the suspension means of the weight 82.

The top of the structure 71 has a hinged lid or closure 84, whereby easy access can be had to the top of the structure, also the lower part thereof, whereby a rodent can be removed from the exterminating chamber.

The revoluble drum of the trap has the inwardly projecting flanges 35 thereof provided with weights 85 and these weights restore said drum to its normal position after having been actuated by a rodent.

In order that the operation of the trap can be understood, reference will be had to Figs. 2 and 5, Fig. 2 showing the trap in a set position and Fig. 5 showing the same after a rat or rodent has entered the same. The tongue 38 of the transverse plate 36 serves as a gang plank and a rat can readily pass over the same onto the transverse plate 36. As the bait holder 43 is elevated, the platform 28 provides means whereby a rat can reach or attempt to reach the bait carried by the pin 46. Immediately upon the rat placing the fore feet upon the platform 28, said platform is tilted to the position shown by dash lines in Fig. 2. Such movement of the platform shifts the rod 22 and the hook shaped arm 17 is moved out of engagement with the slide door 11 and said door descends by gravity, closing the forward end of the box or casing and cutting off the escape of the rat from the trap.

When the slide door 11 is lowered, the arm 52 is carried downwardly by said door and consequently the yoke 50 is tilted, and as said yoke has the end 49 thereof connected to the bait holder 43, the bait holder 43 is tilted and assumes the position shown in Fig. 5. The movement of the bait holder therefore provides sufficient clearance for the rat upon the platform 28 to jump onto the extension 39 of the transverse plate 37.

When the bait holder 43 is tilted to the position shown in Fig. 5, the transverse shaft 57 is rocked and the pawl 63 is actuated to move the rack 61 one space. The indicator 65 of the rack 61 is therefore moved to indicate that one rat or animal has entered the trap.

The bait holder 43 in the position shown in Fig. 5 may assist a rat in jumping onto the extension 39 of the transverse plate 37, and the weight of the rat's body upon the extension 39 is sufficient to revolve the drum comprising the circular heads 34. As the drum revolves, the extension 39 is lowered in proximity to the opening 67 of the side wall 3 whereby the rat can enter the runway 69. As the drum revolves, the tongue 38 is shifted to the position shown by dash lines in Fig. 2, thereby elevating the slide-door 11, and as said door ascends, the lug 15 is engaged by the hook shaped arm 17 and the slide-door is locked in an open position. Simultaneous with the opening of the slide-door 11, the yoke 50 and the bait holder 43 are restored to their normal position, and in consequence of this movement of the bait holder 43, the transverse shaft 57 is again rocked, whereby the pawl 63 can obtain a fresh purchase or grip upon the guide 61. When the extension 39 of the transverse plate 37 is relieved of the weight of the rodent's body, the revoluble drum is immediately restored to its normal position by virtue of the weights 85. The trap is then in condition to receive another rat or rodent. Assuming now that the first rat or rodent has passed into the runway 69, the bars 73 prevent the rat from returning to the box or casing. The rat will ascend the offset portion 70 of the exterminating structure 71 by means of the screen 75 and eventually the rat will reach the platform 77, pass onto the tiltable platform or trap-door 79 which is overbalanced by the weight of the rat, said tiltable platform or trap-door depositing the rat into the water or liquid 76 within the exterminating structure. The rat is drowned and after a number of bodies have accumulated within the exterminating chamber, the lid 84 can be opened and the bodies removed by opening the tiltable platform or trap-door 79.

What I claim is:—

A trap for the purpose set forth comprising a casing, a vertically movable door at the forward end thereof, a revoluble drum within said casing and provided with an inlet and an outlet, a post arranged within the casing and extending into said drum, plates secured to the drum and one terminating in a tongue extending under the door and the other in a platform projecting away from the drum, a tiltable platform supported by said post, a pivoted hook carried by the casing and engaging the door for holding the same open, a rod connecting said hook to said platform, a pivoted bait holder arranged within the drum, a yoke connected to the bait holder, and a rod connected to the yoke and extending through the door and adapted to shift the bait holder when the door is released by a rodent jumping upon the tiltable platform and releasing said hook.

In testimony whereof I affix my signature in the presence of two witnesses.

FILIP CSISZARIK.

Witnesses:
 GEORGE HLATKEY,
 ONSON HRANCE.